(12) United States Patent
Brueck et al.

(10) Patent No.: US 9,249,705 B2
(45) Date of Patent: Feb. 2, 2016

(54) METERING UNIT FOR A REDUCING AGENT, METHOD FOR METERING REDUCING AGENT AND MOTOR VEHICLE HAVING A METERING UNIT

(71) Applicant: Emitec Gesellschaft fuer Emissionstechnologie mbH, Lohmar (DE)

(72) Inventors: Rolf Brueck, Bergisch Gladbach (DE); Jan Hodgson, Troisdorf (DE); Peter Bauer, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 142 days.

(21) Appl. No.: 13/770,067

(22) Filed: Feb. 19, 2013

(65) Prior Publication Data
US 2013/0152554 A1    Jun. 20, 2013

Related U.S. Application Data

(63) Continuation of application No. PCT/EP2011/063926, filed on Aug. 12, 2011.

(30) Foreign Application Priority Data

Aug. 18, 2010  (DE) .................. 10 2010 034 709

(51) Int. Cl.
*F01N 3/00*    (2006.01)
*F01N 3/10*    (2006.01)
(Continued)

(52) U.S. Cl.
CPC *F01N 3/08* (2013.01); *F01N 3/208* (2013.01);
*F01N 2610/14* (2013.01); *F01N 2610/148* (2013.01); *F01N 2610/1453* (2013.01); *F01N 2900/1808* (2013.01); *F01N 2900/1811* (2013.01); *Y02T 10/24* (2013.01)

(58) Field of Classification Search
CPC ............... F01N 2610/14; F01N 2610/1453; F01N 2610/148; F01N 2900/1808; F01N 2900/1811; Y02T 10/20
USPC .............................. 60/286, 295, 303
See application file for complete search history.

(56) References Cited

U.S. PATENT DOCUMENTS 4,082,066 A * 4/1978 Long .................. 123/490
6,908,299 B2 * 6/2005 Asano et al. ............ 431/12
(Continued)

FOREIGN PATENT DOCUMENTS

DE     10149982 A1   4/2003
DE   112006000441 T5  2/2008
(Continued)

OTHER PUBLICATIONS

International Search Report of PCT/EP2011/063926.

*Primary Examiner* — Jesse Bogue
*Assistant Examiner* — Diem Tran
(74) *Attorney, Agent, or Firm* — Laurence A. Greenberg; Werner H. Stemer; Ralph E. Locher

(57) ABSTRACT

A metering unit for a reducing agent includes an injector for supplying the reducing agent to an exhaust gas treatment device. A temperature sensor is disposed at the injector. A method for metering reducing agent and a motor vehicle having a metering unit are also provided.

9 Claims, 2 Drawing Sheets

(51) Int. Cl.
   *F01N 3/08*     (2006.01)
   *F01N 3/20*     (2006.01)

(56)         References Cited

U.S. PATENT DOCUMENTS 7,614,213 B2 *  11/2009  Hirata et al. .................. 60/286
   7,971,426 B2 *   7/2011  Van Nieuwstadt ............. 60/277
   8,281,570 B2 *  10/2012  Gierszewski et al. .......... 60/286
   8,549,842 B2 *  10/2013  Park .............................. 60/289
   2004/0124259 A1  7/2004  Guezennec et al.
   2009/0025370 A1  1/2009  Kondo et al.

FOREIGN PATENT DOCUMENTS

DE      102008001090 A1   11/2008
   WO        2004/024336 A1    3/2004
   WO        2006/050547 A1    5/2006
   WO         2010029792 A1    3/2010

* cited by examiner

METERING UNIT FOR A REDUCING AGENT, METHOD FOR METERING REDUCING AGENT AND MOTOR VEHICLE HAVING A METERING UNIT

CROSS-REFERENCE TO RELATED APPLICATION

This is a continuation, under 35 U.S.C. §120, of copending International Application No. PCT/EP2011/063926, filed Aug. 12, 2011, which designated the United States; this application also claims the priority, under 35 U.S.C. §119, of German Patent Application DE 10 2010 034 709.4, filed Aug. 18, 2010; the prior applications are herewith incorporated by reference in their entirety.

BACKGROUND OF THE INVENTION

Field of the Invention

The invention relates to a metering unit for metering a reducing agent into an exhaust gas treatment device for an internal combustion engine, preferably an internal combustion engine of a motor vehicle. The invention also relates to a method for metering reducing agent and a motor vehicle having a metering unit.

In view of more stringent limit values for the emission of harmful exhaust gas constituents, exhaust gas treatment devices, in which a reducing agent is added to the exhaust gas in order to reduce the harmful exhaust gas constituents, have been increasingly used in recent times in order to purify the exhaust gases of internal combustion engines. A method frequently used in such exhaust gas treatment devices is the selective catalytic reduction (SCR) method, in which nitrogen oxide compounds in the exhaust gas are reduced with the aid of ammonia. In motor vehicles ammonia is frequently not stored directly but in the form of a precursor solution. Ammonia can then be generated from such a precursor solution either internally or externally to the exhaust gas. A precursor solution especially frequently used is a 32.5% urea-water solution which is obtainable, for example, under the trademark AdBlue®. In the following description, the term "reducing agent" is used equally for reducing agents and for reducing agent precursors, reducing agent precursor solutions, etc.

In an exhaust gas treatment device for selective catalytic reduction, especially precise metering or dosing of the reducing agent is regularly required.

SUMMARY OF THE INVENTION

It is accordingly an object of the invention to provide a metering unit for a reducing agent, a method for metering reducing agent and a motor vehicle having a metering unit, which overcome the hereinafore-mentioned disadvantages and at least partially solve the highlighted technical problems of the heretofore-known units, methods and vehicles of this general type. In particular, an especially cost-effective device for metering reducing agent, with which especially precise metering of the reducing agent is possible, is to be specified.

With the foregoing and other objects in view there is provided, in accordance with the invention, a metering unit for a reducing agent. The metering unit includes an injector for supplying the reducing agent to an exhaust gas treatment device and a temperature sensor provided at the injector.

The invention relates, in particular, to a metering unit for a reducing agent, including a reducing agent tank, an injector for supplying the reducing agent to an exhaust gas treatment device, a delivery unit for delivering reducing agent from the reducing agent tank to the injector and a temperature sensor disposed at the injector. In this case, in particular, a liquid urea-water solution is stored and is metered by the injector.

The temperature sensor may be an (integral) component of the injector. It is also possible that the temperature sensor is disposed in immediate proximity to the injector. Preferably, the distance between the point at which the reducing agent emerges from the injector and the temperature sensor, is less than 100 mm [millimeters], preferably less than 50 mm [millimeters] and especially preferably even less than 20 mm [millimeters].

The temperature sensor may be at least partially in direct contact with the reducing agent. However, it is also possible that the temperature sensor is spaced apart from the reducing agent and is in contact with the reducing agent through a thermally conductive element. This thermally conductive element may, for example, be a housing of the injector and/or the reducing agent line. In this case the thermally conductive element is preferably temperature-sensitive (for example thin-walled, having high thermal conductivity, etc.), so that it transmits the actual temperatures rapidly and accurately to the temperature sensor. Preferably, the distance from the reducing agent to the injector is less than 10 mm [millimeters], preferably less than 2 mm [millimeters] and especially preferably less than 1 mm [millimeter].

It has been found that, in particular, the flow properties and/or viscosity of reducing agents (in particular urea-water solution) depend to a considerable extent on the temperature of the reducing agent. The temperature of the reducing agent at the injector corresponds substantially to the temperature of the injector itself and therefore, in some cases, deviates significantly from the temperature of the reducing agent in the reducing agent tank or in remote regions of the reducing agent line. The injector is usually disposed directly on the exhaust gas treatment device and can therefore itself have strongly fluctuating temperatures in operation, because of the different exhaust gas temperatures. It is therefore advantageous to determine the temperature of the reducing agent at the injector, and to adapt the opening time of the injector with reference to, and/or while taking account of, the measured temperature. The quantity of reducing agent supplied is determined to a substantial degree by the opening time of the injector. Preferably using the measured temperature, a flowability, a flow behavior, the viscosity and/or shear resistance of the reducing agent is/are determined or calculated as a parameter. This parameter is then in turn taken into account in determining the opening time of the injector.

In accordance with another especially advantageous feature of the metering unit of the invention, a reducing agent line having a length of at least 20 cm [centimeters], preferably at least 50 cm [centimeters] and especially preferably at least 100 cm [centimeters] is provided between the delivery unit and the injector. With such a long reducing agent line, temperatures of the reducing agent in the delivery unit which deviate highly from the temperature of the reducing agent at the injector can regularly occur. With such a long delivery line it is therefore especially expedient to (also) provide a temperature sensor on the injector. Optionally, the temperature sensor on the injector may be the only temperature sensor provided in the metering unit.

In accordance with a further advantageous feature of the metering unit of the invention, the injector has an electric coil which is configured or set up to perform at least the following functions:

electromagnetic opening of the injector, and ascertaining a temperature by determining the electrical resistance of the coil.

The electrical resistance of an electric coil for opening the injector generally has a certain temperature-dependence. A material may also optionally be used for the conductive tracks of the electric coil which has a temperature-dependence of the electrical resistance of at least 0.2% per Kelvin, preferably at least 1% per Kelvin and especially preferably at least 3% per Kelvin. It can thereby be ensured that, in the event of a change of temperature, a significant, measurable change in the resistance of the coil occurs.

In accordance with an added advantageous feature of the metering unit of the invention, a pressure sensor is additionally provided on the injector. In this case both a temperature sensor and a pressure sensor are provided on the injector. Preferably, the temperature sensor is at the same time a pressure sensor. For example, the pressure sensor may be embodied as a conductive track which deforms under a change of pressure and thereby changes its electrical resistance, whereby a pressure change can be detected. This conductive track may at the same time be utilized as a temperature sensor. A reference sensor is then additionally required to determine the cross-influence of the temperature on the pressure sensor. This reference sensor may be implemented in the form of a second electrical conductive track which is not deformed in the event of a pressure change.

In a further embodiment, the temperature sensor includes a conductive track or a coil which has no further function. This conductive track or coil may be constructed to be especially small. For example, the coil may be a platinum resistance wire with a resistance of more than 80 ohms, preferably more than 400 ohms and especially preferably more than 2500 ohms. Such a resistance wire has very low thermal capacity and therefore reacts very quickly to temperature changes.

In a further embodiment, the temperature sensor may be a thermocouple.

With the objects of the invention in view, there is also provided a method for metering reducing agent into an exhaust gas treatment device, in which the metering is carried out by an injector. The method comprises at least the following steps:

a) determining a temperature of the reducing agent close to the injector,
b) determining a flow behavior of the reducing agent as a function of the temperature,
c) determining an opening time of the injector as a function of the flow behavior,
d) opening the injector for a certain opening time.

The determination or measurement of the (present) temperature in step a) may be effected, for example, using a temperature sensor disposed directly on the injector. In this case the temperature of the reducing agent may be determined directly or indirectly through a temperature-sensitive heat conductor.

The term "flow behavior" in step b) also includes, in particular, a shear resistance and/or a viscosity of the reducing agent. The determination of flow behavior in step b) may be effected, for example, by a calculation using a formula stored in a control device, with the temperature determined in step a) being taken into account in the formula. Likewise, limit values, input-output maps or the like may be stored in the control device, so that a comparison of the temperature determined with the stored information can yield a characteristic value for the following steps.

In step c) a formula and/or input-output map stored in a control device may likewise be used to calculate the opening time of the injector. This formula also takes into account the flow behavior calculated in step b).

The supply of reducing agent to the exhaust gas treatment device is effected by opening the injector in step d).

In accordance with another especially advantageous mode of the method of the invention, at least one of the following influencing parameters is also taken into account at least in determining the flow behavior in step b) or in determining the opening time in step c):

a pressure of the reducing agent at the injector,
at least one chemical property of the reducing agent,
at least one physical property of the reducing agent, or
a necessary quantity of reducing agent.

For clarification, it should be pointed out, in particular, that the influencing parameters may also be taken into account in both steps b) and c), and that different influencing parameters may be taken into account in the steps.

The shear resistance or the flow behavior or the viscosity of the reducing agent may also additionally depend on the pressure of the reducing agent, so that it is advantageous also to take into account this pressure in determining the flow behavior in step b). The quantity of reducing agent passing through the injector during a given opening time of the injector depends to a substantial degree on the pressure of the reducing agent at (before and/or in) the injector. It is therefore advantageous if the pressure is also taken into account when calculating the opening times in step c).

A chemical composition of the reducing agent may, for example, be used as a chemical property of the reducing agent which may be taken into account in calculating the flow behavior (in step b)) and/or in calculating the opening time of the injector (in step c)). For example, a concentration of urea in the reducing agent and/or the presence of certain additives in the reducing agent may be taken into account in this case.

The density, thermal conductivity, electrical conductivity, surface tension and/or aggregate condition of the reducing agent may, for example, be taken into consideration as a physical property. In some cases information on the flow behavior or the viscosity of the reducing agent may already be available prior to carrying out the method according to the invention, which information is then only corrected in the course of the method according to the invention. This pre-existing information on flow behavior or viscosity may be referred to, for example, as the comparative viscosity. Such a comparative viscosity of the reducing agent may be stored, for example, in a control device. It is also possible that the quality and/or temperature of the reducing agent in the tank is measured regularly and a comparative viscosity is determined therefrom. This comparative viscosity may then also be taken into account in step b) of the method according to the invention. For example, it may be ensured that the flow behavior or viscosity determined in step b) deviates from the comparative viscosity by not more than a predefined value. It is also possible that in step b) the comparative viscosity is included with a weighting of more than 10%, preferably more than 50%, in the calculation of the flow behavior or the viscosity.

In addition, it is also advantageous to take into account a necessary quantity of reducing agent in determining the flow behavior and/or in determining the opening time. The necessary quantity of reducing agent has an important influence on the opening time of the injector determined in step c). In step b) the necessary quantity of reducing agent can form a cross-influence on the determining of the flow behavior.

In accordance with a further especially advantageous mode of the method of the invention, the proposed method is repeated multiple times, with a minimum time interval elapsing between step d) of a first implementation of the method and step a) of a following implementation of the method. The multiple repetition of the method may also be referred to as an iterative method implementation. Each individual implementation of steps a) to d) of the method can then be referred to as a method iteration. The method implementation following the first method iteration is preferably the method implementation directly following the first method implementation, or the directly following method iteration.

It is also possible that step a) and step b) are carried out with a lower repetition rate than step c) and step d). In that case the determination of the temperature and the determination of the flow behavior of the reducing agent are carried out, for example, at less than each fifth, preferably at less than each tenth and especially preferably at less than each fiftieth opening process of the injector. A minimum time interval between step d) of a first method implementation and step a) of the following method implementation may be, for example, at least 5 s [seconds], preferably at least 10 s [seconds] and especially preferably at least 1 min [minute]. As the injector is opened, additional heat is generated as a result of the flow of electric current. This heat would falsify the temperature measured by the temperature sensor. It is therefore advantageous to allow the minimum time interval described to elapse. As a result of allowing the specified minimum time interval to elapse, an equalization of the temperature of the reducing agent and of the injector takes place. The injector has a certain thermal capacity which is optionally to be respected in this case.

It may also be advantageous that the method according to the invention is interrupted when the internal combustion engine connected to the exhaust gas treatment device is operated at not less than 90% of full load of the internal combustion engine. Preferably, the method according to the invention is already interrupted when the internal combustion engine is operated at more than 80%, and especially preferably at more than 50%, of full load. Under such load conditions very large quantities of reducing agent must be metered into an exhaust gas treatment device. For this purpose an injector must be opened very frequently, so that in this case a calculation might be time-critical and, moreover, the temperature stresses for these time periods are substantially constantly high.

The advantages and embodiment-features described for the method according to the invention are transferable analogously to the metering unit according to the invention. The same applies to the special advantages and embodiment-features described for the metering unit according to the invention. The method according to the invention can therefore be implemented, in particular, using an embodiment of the metering unit according to the invention.

With the objects of the invention in view, there is concomitantly provided a motor vehicle, comprising an internal combustion engine, an exhaust gas treatment device for cleaning exhaust gases of the internal combustion engine, a metering unit according to the invention and a control device for controlling a supply of reducing agent to the exhaust gas treatment device. The control device is configured to implement a method according to the invention.

Other features which are considered as characteristic for the invention are set forth in the appended claims, noting that the features listed separately in the claims can be combined with one another in any technologically useful manner, and can be supplemented by explanatory material from the description, with further variants of the invention being indicated.

Although the invention is illustrated and described herein as embodied in a metering unit for a reducing agent, a method for metering reducing agent and a motor vehicle having a metering unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
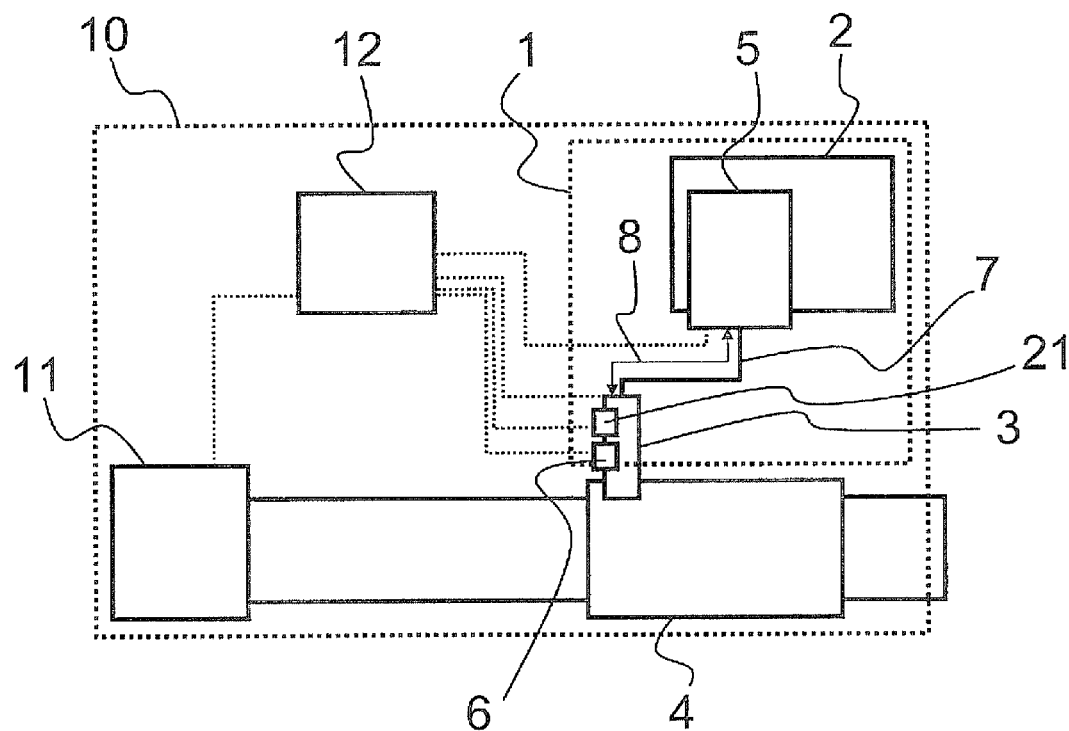
FIG. 1 is a block diagram of a motor vehicle having a metering unit according to the invention.

Referring now in detail to the figures of the drawings, which show especially preferred exemplary embodiments to which the invention is not restricted and in which the figures and, in particular, dimensional relationships shown therein are merely diagrammatic, and first, particularly, to FIG. 1 thereof, there is seen a motor vehicle 10 which has an internal combustion engine 11 and an exhaust gas treatment device 4 for cleaning exhaust gases of the internal combustion engine 11. The exhaust gas treatment device 4 has an injector 3 (valve) with which reducing agent can be supplied to the exhaust gas treatment device 4. The injector 3 is also a component of a metering unit 1 which, apart from the injector 3, also includes a reducing agent tank 2, a delivery unit 5 and a reducing agent line 7. Reducing agent (in particular a urea-water solution) is conveyed by the delivery unit 5 through the reducing agent line 7 to the injector 3. The reducing agent line 7 has a length 8. A temperature sensor 6 and (optionally) a pressure sensor 21 are provided on the injector 3. In addition, the motor vehicle 10 has a control device 12 with which the injector 3 and the delivery unit 5 can be controlled. For this purpose, the control device 12 is connected to various components of the motor vehicle 10. In this case, a connection to the internal combustion engine 11, a connection to the delivery unit 5, a connection to the injector 3 and a connection to the temperature sensor 6 are shown as examples. The control device is set up or configured to control the injector 3 as a function of data made available through these connections.

Figure 2:
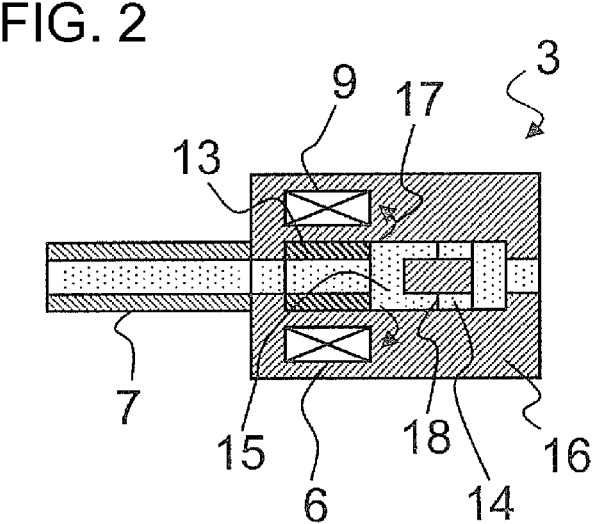
FIG. 2 is an enlarged, longitudinal-sectional view of an injector for a metering unit according to the invention.

FIG. 2 shows an injector 3 for supplying reducing agent (in particular a urea-water solution) to an exhaust gas treatment device. The injector 3 is connected to a reducing agent line 7. A valve armature 13, with which the injector 3 can be opened or closed, is provided in the injector 3. When the injector 3 is closed, the valve armature 13 is positioned against a stop 18. An opening of the injector 3 can be effected by moving the valve armature 13 through the use of an electric coil 9. In the case of the injector 3 as shown in FIG. 2, the electric coil 9 serves at the same time as a temperature sensor 6. A temperature of a reducing agent 15 is transferred to the electric coil 9 through heat conduction 17 represented by arrows. The heat conduction 17 also operates through a valve block 16. With the injector 3 closed, a channel 14 is closed. When the injector 3 is opened, this channel 14 establishes a passage from the injector 3 or from the reducing agent line 7 to the exhaust gas treatment device 4.

Figure 3:
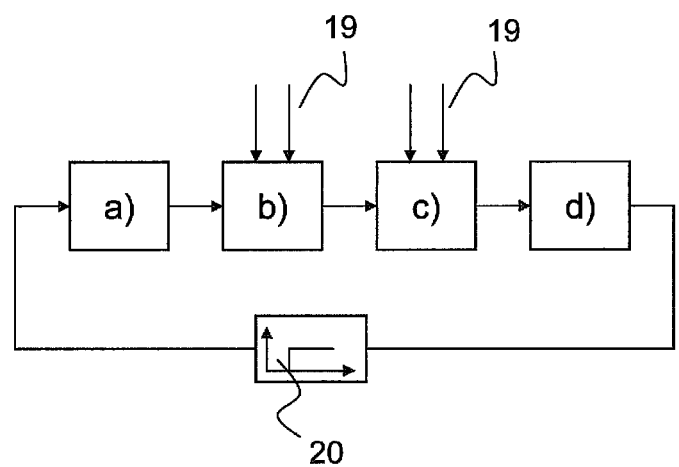
FIG. 3 is a flow diagram of a method according to the invention.

FIG. 3 shows a method according to the invention including steps a), b), c) and d) illustrated in a block diagram. It is seen that the method is repeated regularly in the manner of a loop. It is also seen that after the performance of step d) a time interval 20 is allowed to elapse before a renewed performance of step a) takes place. It is also shown that various influencing parameters 19 are also taken into account in process steps b) and c). These influencing parameters 19 may, for example (as mentioned above), be the pressure of the reducing agent at the injector, at least one chemical property of the reducing agent, at least one physical property of the reducing agent, or a necessary quantity of reducing agent.

The present invention, therefore, at least partially solves the technical problems of the prior art which have been described. In particular, an especially cost-effective device for metering reducing agent, with which especially precise metering of the reducing agent is possible, has been specified.

The invention claimed is:

1. A metering unit for a reducing agent, the metering unit comprising:
   an injector for supplying the reducing agent to an exhaust gas treatment device, said injector including an electric coil having conductive tracks, a material being used for said conductive tracks having a temperature-dependency of the electrical resistance of at least 0.2% per Kelvin, said electric coil configured to perform at least the following functions:
   electromagnetic opening of said injector; and
   ascertaining a temperature by determining an electrical resistance of said coil; and
   a controller configured for:
   controlling the electromagnetic opening of said injector via said coil; and
   deriving a temperature value by determining the electrical resistance of said electric coil.

2. The metering unit according to claim 1, which further comprises a delivery unit and a reducing agent line connected between said delivery unit and said injector, said reducing agent line having a length of at least 20 cm [centimeters].

3. The metering unit according to claim 1, which further comprises a pressure sensor disposed at said injector.

4. The metering unit according to claim 1, wherein said material that is used for said conductive tracks has a temperature-dependency of the electrical resistance of at least 1% per Kelvin.

5. The metering unit according to claim 1, wherein said material that is used for said conductive tracks has a temperature-dependency of the electrical resistance of at least 3% per Kelvin.

6. A method for metering reducing agent into an exhaust gas treatment device by using an injector, the method comprising the following steps:
   a) determining a temperature of the reducing agent in vicinity of the injector by determining an electrical resistance of a coil of the injector, the electric coil having conductive tracks, a material being used for the conductive tracks having a temperature-dependency of the electrical resistance of at least 0.2% per Kelvin;
   b) determining a flow behavior of the reducing agent as a function of the temperature;
   c) determining an opening time of the injector as a function of the flow behavior; and
   d) opening the injector for a certain opening time.

7. The method according to claim 6, which further comprises, at least in determining the flow behavior in step b) or in determining the opening time in step c), taking at least one of the following influencing parameters into account:
   a pressure of the reducing agent at the injector;
   at least one chemical property of the reducing agent;
   at least one physical property of the reducing agent, or
   a necessary quantity of reducing agent.

8. The method according to claim 6, which further comprises repeatedly implementing the steps of the method multiple times, and allowing at least a minimum time interval to elapse between step d) of a first implementation of the method and step a) of a directly following implementation of the method.

9. A motor vehicle, comprising:
   an internal combustion engine;
   an exhaust gas treatment device for cleaning exhaust gases of said internal combustion engine;
   a metering unit having an injector for supplying a reducing agent to said exhaust gas treatment device and a temperature sensor disposed at said injector; and
   a control device connected to said injector for controlling the supply of reducing agent to said exhaust gas treatment device, said control device configured to implement the method according to claim 6.

* * * * *